United States Patent Office 3,533,039
Patented Oct. 6, 1970

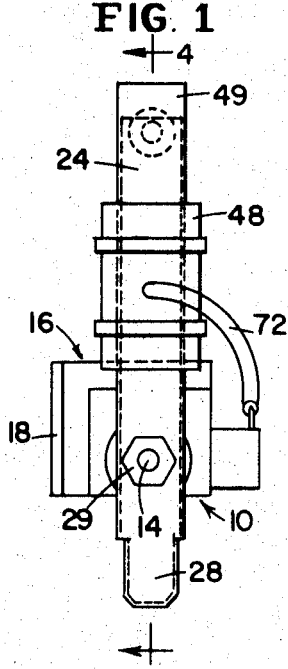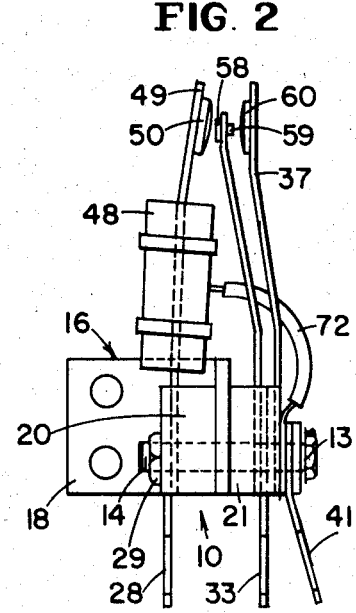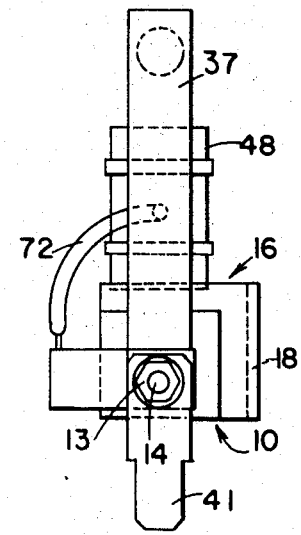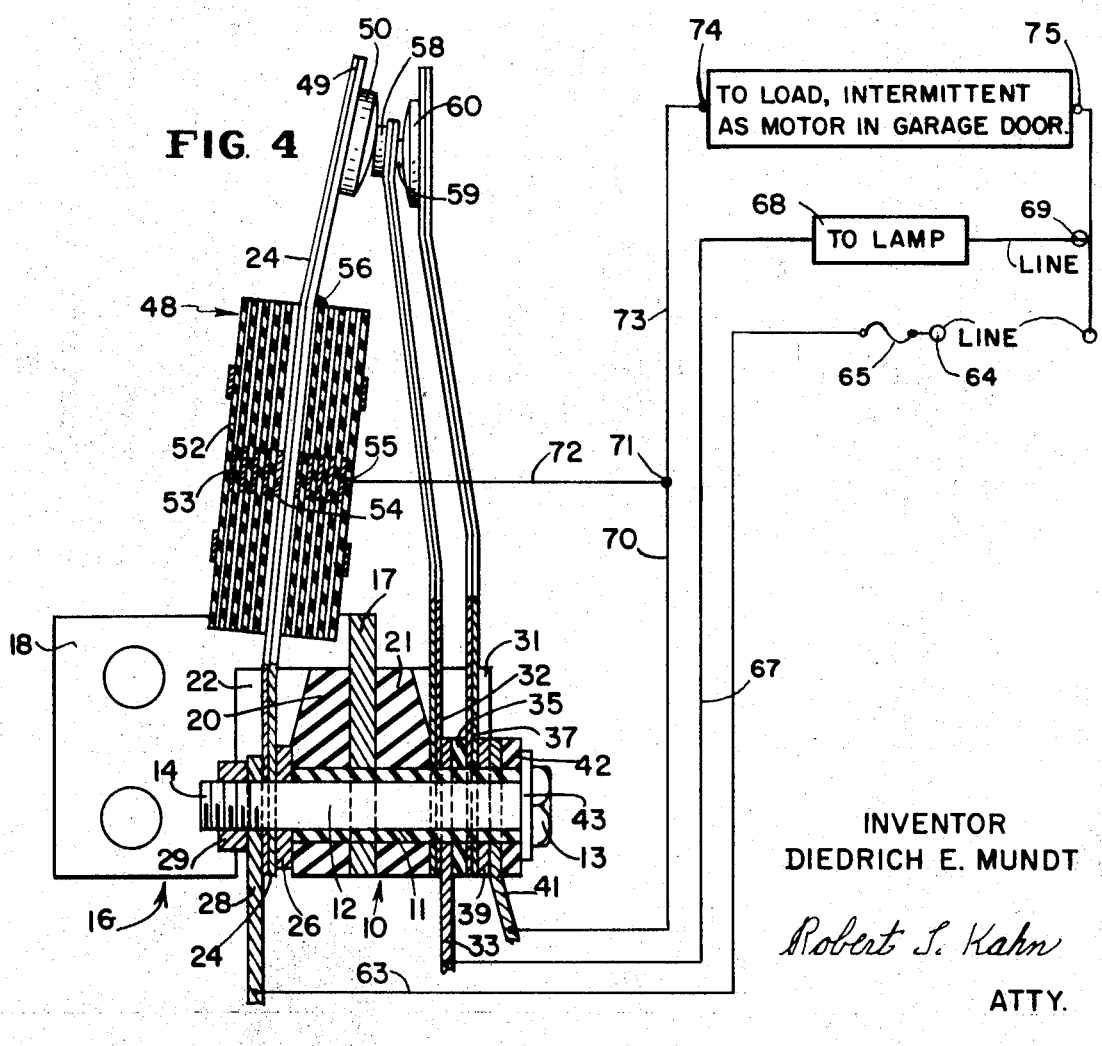

3,533,039
THERMOSTATIC SWITCH AND SAFETY
CIRCUIT THEREFOR
Diedrich E. Mundt, Niles, Ill., assignor to Hold-Heet
Products Corp., Chicago, Ill., a corporation of Illinois
Filed Apr. 14, 1969, Ser. No. 815,555
Int. Cl. H01h 63/013, 71/22, 79/00
U.S. Cl. 337—103                                      8 Claims

ABSTRACT OF THE DISCLOSURE

A thermostatic switch system has an electric heating element for a bi-metallic blade and in a preferred form has additional bi-metallic blades compensating against temperature. The heating element is normally energized for a short time when, such as a garage door operator, is energized. The thermostatic switch provides a desired delay during which an additional load, as an electric light, may be energized. If the principal load, consisting of a motor, as an example, is energized for an excessively long period of time, endangering the heating element of the thermostatic switch, the switch system will operate to short circuit the heater, preventing permanent damage thereto. The switch includes cooperating contacts for effecting switch action.

This invention relates to a thermostatic switch and safety circuit therefor for providing delayed switch action for use with loads normally having short operating periods. Although not limited thereto, one example of such load is a garage door operator wherein an electric motor is used for opening or closing a garage door. Such garage door operator may be started by manual operation of a switch to go through an operating cycle and is usually stopped by limit switches when such door has reached a fully opened or fully closed position.

In connection with such door operation, means are provided for turning on an electric light and have such light remain on for a period of time substantially longer than required for door movement alone.

Generally, the electric motor for effecting door operation will be energized for a comparatively short time, usually between about eight and about fifteen seconds. Sometimes during winter weather, a door moving operation may last longer. It has been the practice to have a thermostat provided with snap acting switch means for controlling the lamp circuit. Normally, such a thermostat has an electric heater for thermally energizing the thermostat element. Such a heater is normally connected in series with a door operating electric motor. The motor current would thus be a current pulse of about 8 to 15 seconds for heating the thermostat element. The heater itself is designed for transient electric energization and is not adapted for carrying the motor current for a time which is substantially longer than the average door motor duty cycle. Such prior thermostat means, including snap acting switch means, require a complete cycle of operation including time for cooling of the bi-metal.

In prior thermostat switches, the safety margin for heater energization is so small that unusually long motor operation could result in burning out the heater. Since the thermostat switch heater is in series with the door moving motor, the destruction of such switch heater disables the door operating motor.

In accordance with the present invention, a thermostatic switch and safety circuit therefor are provided which protect the heater against burn out, irrespective of the duration of a motor operating cycle or frequency of door operation. In addition, the new thermostatic system eliminates the necessity for snap-acting switches and makes it possible to initiate and/or terminate door operating cycles without regard to cycle duration or where and how often a door operating cycle is initiated or terminated.

The invention, in general, provides for a switch construction having a thermostatic blade of bi-metal having an electric heater for operating on the bi-metal. Such heater is designed normally to carry the motor operating current for a normal motor operating time without damage thereto. Additional means, including electric contacts are provided for short circuiting the heater after a pre-determined delay to prevent burnout of the heater if motor current through the heater is likely to damage the heater. Such additional contact means include contact blades carrying additional contacts so that thermostatic response to heater energization can function to short circuit the heater and thereafter control the time for lamp energization. The operation of the new thermostatic switch system does not involve trigger-like action which makes it necessary for thermostatic switch operation to continue through a complete operating cycle to reset the thermostatic switch system for a new cycle.

In order that the invention may be understood, it will now be described in connection with the drawings wherein:

FIG. 1 is an elevation of a thermostatic switch embodying the present invention.

FIG. 2 is an elevation of the thermostatic switch construction illustrated in FIG. 1, the view being at right angles to FIG. 1.

FIG. 3 is an elevation similar to FIG. 1 but from the other side of the construction.

FIG. 4 is an elevation partly in section along line 4—4 of FIG. 1, FIG. 4 also showing circuit connections, the switch in FIG. 4 being shown in a hot condition corresponding to the end of a door operating cycle.

The new switch comprises stack 10, having sleeve 11 of rigid insulating material such as porcelain, glass or other suitable molded product. Lying within sleeve 11 and projecting beyond the ends thereof, is bolt 12 usually of steel having head 13 and threaded end 14. Disposed about sleeve 11 approximately at or near the center portion thereof, is angle iron 16 having apertured portion through which insulating sleeve 11 extends. Angle iron 16 has portion 18 for anchoring the entire switch constructing to a suitable support. Disposed about insulating sleeve 11 on opposite sides of angle iron portion 17 are blocks 20 and 21 of rigid insulation such as porcelain, steatite or any other suitable material.

Blocks 20 and 21 are suitably apertured for accommodating insulating sleeve 11. Block 20 is recessed at 22 to accommodate the width of blade 24 of bi-metal of suitable gauge. The bi-metal may be of any desired metals bonded together to provide thermostatic action. Referring specifically to FIG. 4, the bi-metal is so arranged that response to heat will cause blade 24 to bend toward the right.

Bi-metal blade 24 has metal washer 26 against one blade face and fits snugly about bolt 12 against the end of insulating sleeve 11. Disposed against the other face of blade 24 is contact lug 28, disposed about threaded portion 14 of bolt 12. Nut 29 is threaded over bolt portion 14, and is drawn tightly against lug 28. Lug 28 and part of bolt 29 may extend beyond recessed portion 22 of insulating block 20.

Insulating block 21 is similarly recessed at 31 and has blade 32 disposed against block 21 and extending from stack 10. Blade 32 is disposed about insulating sleeve 11 and has lug 33 disposed about insulating sleeve 11 and against the bottom end portion of blade 32. Lug 33 extends laterally below the stack and is in electrical contact with the lower part of blade 32. Lug 33 has insulating washer 35 disposed against lug 33 and about insulating sleeve 11 and has blade 37 disposed about insulating sleeve 11. Metal washer 39 is disposed about insulating sleeve 11 against the bottom end portion of blade 37, and has contact lug 41 disposed about insulating sleeve 11 lying against the metal washer 39. Extending beyond contact lug 41 is insulating washer 42 of insulating material as mica having some degree of compressibility. Compressible washer 42 is normally disposed about insulating sleeve 11 and has steel washer 43 against the end of sleeve 11 disposed about bolt 12 and extending at the side of compressible washer 42. The stack is maintained tight by bolt and nuts.

Blade 24 extends upwardly from the stack for a distance. As an example, blade 24 may have a length of about two inches and may extend about 1 or 1½ inches beyond the stack. A portion of the length of the bi-metal is covered with an electric heater construction. Bi-metal blade 24 may have a thickness, as an example, of the order of about .040" and a width of the order of about $\frac{4}{16}$ or $\frac{5}{16}$ of an inch. Blade 24 has a substantial part of its length covered by heater 48 and terminates in tip portion 49 carrying electric contact button 50. Button 50 is on the side of blade 49 toward which the blade tends to bend in response to temperature rise.

Heater 48 may have any desired construction and conveniently consists of a length of asbestos paper 52, wound to form a roll with flat metal ribbon 53 having one end welded to blade 24 at 54 and having the other end terminating at 55 on the outside of heater 48. The heater may be painted with heat resistant material such as plaster of paris or other material which can dry to a rigid, heat resistant body. The heater, consisting of insulating material and heater ribbon, may be fabricated prior to disposing the heater loosely about the blade. Heater 48, consisting of ribbon and insulation, is cemented by plaster of paris or otherwise rigidly secured to bi-metal blade 24 at one end only, such as, for example, at 56. The heater is otherwise loose about blade 24 and permits blade 24 to bend in response to heat.

The physical dimensions of the heater construction, the tightness of the wrap, the length of heater ribbon, the looseness of the heater roll about the blade, and other variables are all so designed as to provide desired temperature rise of bi-metal blade 24 in response to a predetermined electric pulse on the heater ribbon. The ribbon may be of Nichrome or other conventional heater metal. By controlling the mass of heater metal, insulating material, mass of bi-metal, dimensions of covered and exposed bi-metal, nature of metals in the bi-metal, a desired bi-metal response may be obtained.

Blades 32 and 37 respectively extend laterally from stack 10 and preferably consist of bi-metal with the blades curving toward the right, as seen in FIG. 4, in response to temperature rise. The thermostatic switch is housed in an enclosure, not shown. Blades 32 and 37, if both are of bi-metal, will compensate for changes in ambient temperature. Thus, a garage may have its temperature range from a high of well above 100° F. in summer down to well below zero in winter.

The blades can be bent to provide desired spacing between the blade tips for adjusting operating temperature ranges. Blade 32 carries contact buttons 58 and 59 on opposite faces thereof, while blade 37 carries contact button 60 on the face opposite button 59. When the thermostatic switch responds to heat generated in the heater winding (the loose layers in the heater structure will trap air to provide desired heat paths) blade 24 will curve toward blade 32, causing contact button 50 to engage contact button 58. Thereafter, further curving of blade 24 results in blade 32 being urged by button 50 as well as responding to heat so that blade 32 moves toward blade 37. Blade 37 (which alone may be of one metal) will also curve toward the right, if bi-metal is used.

Electrical connections are as follows: Lug 28 which is in electrical contact with blade 24, is connected by wire 63 to line terminal 64. As a rule, lug 28 will be connected to line terminal 64 through fuse 65 or a circuit breaker for motor protection.

Lug 33, which is in electrical contact with blade 32, is connected by wire 67 through lamp 68 to line terminal 69.

Lug 41, which is in electrical contact with blade 37, is connected by lead 70 to junction point 71. From junction point 71, lead 72 goes to terminal 55 of the electric heater. Junction point 71 is connected by wire 73 to one terminal 74 of the electric motor or other load, the other terminal 75 of such load being connected to line terminal 69.

The heater structure may be wound over blade 24 before the blade is assembled in the stack. The heater structure may also be made from mica strips with resistance wire or ribbon to provide a generally conventional heater arrangement. In all cases, the heater structure should have desired heat conductivity as well as desired heat storage characteristics. The housing may function to impart desired heat response characteristics to the thermostatic switch structure.

The temperature response characteristics may be determined to control the on-time for heater energization.

Thus, initially, with the three blades as illustrated in FIG. 2, when a door operating cycle is to begin, the application of suitable electric power will cause current to pass through the motor windings and thermostat heater in series. When blade 24 responds to heat from the thermostat heater, blade 24 will cause contact 50 to close against contact 58. This may take about 8 to 15 seconds, depending upon temperature conditions. By adjusting the relative normal positions of blades 24 and 32, contact closure of butons 50 and 58 may be accomplished prior to or after door operation has been accomplished. The heater characteristics will also have an effect upon the time when contacts 50 and 58 close. When these contacts close, lamp 69 will go on, the lamp current not passing through the heater. Whether current is still passing through the heater and motor, or not, is immaterial. If the door operating cycle has already been completed, an automatic door controlled switch will open the motor circuit, cutting the electric current through the heater and motor.

If the thermostatic switch continues to respond to a temperature rise from the heater, blades 24, 32 and 37 will finally reach the position illustrated in FIG. 4, where contacts 50, 58, 59 and 60 are tight against each other. When this occurs, the heater is shorted out of the motor circuit, irrespective whether the motor circuit is still live or dead. Lamp 68 remains on until blade 24 moves contact 50 clear of contact 58 or blades 32 and/ or 37 open contacts 59 and 60.

Due to the direct relationship between the temperature and thermostat response and absence of snap-action, the switch action can be terminated, re-initiated or allowed to proceed to completion, as desired without regard to time or previous condition of the thermostatic switch system.

By controlling the various heater and bi-metal parameters, as well as the nature of switch housing, a wide variety of operative and delay characteristics may be provided.

What is claimed is:

1. A thermostatic switch comprising a generally flat bi-metal blade, means for rigidly supporting said blade at one end, said blade tending to curve in one direction with temperature rise, an electric contact at said other blade end on the blade face facing said one direction, an electric heater for said blade for causing said blade to curve toward said one direction upon heater energization, a second, generally flat metal blade, means for supporting said second blade at one end in spaced relation to said first blade with said second blade facing the contact bearing face of the first blade, contacts carried by said second blade at its other end on both faces, a third metal blade, means for supporting said third blade at one end in spaced relation to said second blade facing the second blade face remote from the first blade, a contact carried by the third blade at its other end on the blade face opposite the second blade, said first blade being adapted to curve toward said second blade in response to heater energization, and said second blade being adapted to be moved toward said third blade, all said blade contacts being adapted to provide a through contact to contact electrical path between the three blades, means for grounding one heater terminal to said first blade, terminals for each blade, a metallic connection between the third blade and remaining heater terminal, said heater being designed to carry an electric current in series with a transient load until said three blades are in contact with each other in response to heater energization, whereupon said heater is shorted out and when said first blade only contacts the second blade, said first two blades can connect a lamp or other device in circuit other than the first mentioned transient load.

2. The construction according to claim 1 wherein said second blade is of bi-metal, with the second blade also curving away from the first blade with rise in temperature.

3. The construction according to claim 1 wherein the second and third blades are of bi-metal, the three blades all tending to curve in the same direction with increase in temperature, said second and third blades providing compensation for ambient temperature.

4. The construction according to claim 1 wherein said blade support means comprises a stack, and means clamping one end of each blade in said stack, electrically insulated from the blades.

5. The construction according to claim 1 wherein said heater includes a wrap of electrical insulation about the first blade, said wrap including heater material as part of the wrap and means securing said wrap to said blade at one part of said wrap, said layer wrap providing a generally loose wrap to provide a controlled air space between layer wraps.

6. The construction according to claim 5 wherein said three blades are of bi-metal, with the three blades tending to curve in the same direction.

7. The construction according to claim 6 wherein a stack is provided for supporting said blades in a stack in insulating relation.

8. The construction according to claim 7 wherein a connection between one terminal of a door operator and between a heater terminal and third blade is provided, a connection between the second blade and a lamp is provided, a connection between a power line and first blade is provided and wherein the other power line is connected to the other lamp and free motor terminals.

References Cited

UNITED STATES PATENTS

| | | | |
|---|---|---|---|
| 3,210,502 | 10/1965 | Slonneger | 337—85 XR |
| 3,003,086 | 10/1961 | Strobel et al. | 337—103 XR |
| 2,574,869 | 11/1951 | Green | 337—88 |

BERNARD A. GILHEANY, Primary Examiner

D. M. MORGAN, Assistant Examiner

U.S. Cl. X.R.

337—100, 105